(12) United States Patent
Hagan et al.

(10) Patent No.: US 10,240,470 B2
(45) Date of Patent: Mar. 26, 2019

(54) BAFFLE FOR GAS TURBINE ENGINE VANE

(71) Applicant: United Technologies Corporation, Hartford, CT (US)

(72) Inventors: Benjamin F. Hagan, Manchester, CT (US); Ryan A. Waite, South Windsor, CT (US); Brandon W. Spangler, Vernon, CT (US); Steven B. Gautschi, Naugatuck, CT (US)

(73) Assignee: United Technologies Corporation, Farmington, CT (US)

( * ) Notice: Subject to any disclaimer, the term of this patent is extended or adjusted under 35 U.S.C. 154(b) by 427 days.

(21) Appl. No.: 14/911,148

(22) PCT Filed: Jun. 30, 2014

(86) PCT No.: PCT/US2014/044883
§ 371 (c)(1),
(2) Date: Feb. 9, 2016

(87) PCT Pub. No.: WO2015/030926
PCT Pub. Date: Mar. 5, 2015

(65) Prior Publication Data
US 2016/0186587 A1 Jun. 30, 2016

Related U.S. Application Data

(60) Provisional application No. 61/872,357, filed on Aug. 30, 2013.

(51) Int. Cl.
*F01D 9/06* (2006.01)
*F01D 5/18* (2006.01)

(52) U.S. Cl.
CPC .............. *F01D 9/065* (2013.01); *F01D 5/189* (2013.01); *F05D 2220/32* (2013.01); *F05D 2240/126* (2013.01); *F05D 2250/182* (2013.01); *F05D 2250/183* (2013.01); *F05D 2250/184* (2013.01); *F05D 2260/204* (2013.01); *Y02T 50/673* (2013.01); *Y02T 50/676* (2013.01)

(58) Field of Classification Search
CPC .......... F01D 5/188; F01D 5/189; F01D 9/065; F05D 2220/32; F05D 2240/126; F05D 2250/182; F05D 2250/183; F05D 2250/184; F05D 2260/204; Y02T 50/673; Y02T 50/676
See application file for complete search history.

(56) References Cited

U.S. PATENT DOCUMENTS

| 3,806,276 A | 4/1974 | Aspinwall |
| 3,936,215 A | 2/1976 | Hoff |
| 4,697,985 A | 10/1987 | Suzuki |

(Continued)

FOREIGN PATENT DOCUMENTS

GB 1366704 9/1974

OTHER PUBLICATIONS

Extended EP Search Report dated Aug. 16, 2016.

*Primary Examiner* — Carlos A Rivera
*Assistant Examiner* — Eric J Zamora Alvarez
(74) *Attorney, Agent, or Firm* — O'Shea Getz P.C.

(57) ABSTRACT

A vane structure includes an airfoil section with a first inner airfoil wall surface and a second inner airfoil wall surface. A baffle is mounted within the airfoil section between the first inner airfoil wall surface and the second inner airfoil wall surface.

14 Claims, 9 Drawing Sheets

(56) References Cited

U.S. PATENT DOCUMENTS

| | | | | |
|---|---|---|---|---|
| 4,901,520 | A | 2/1990 | Kozak et al. | |
| 5,145,315 | A | 9/1992 | North et al. | |
| 5,288,207 | A | 2/1994 | Linask | |
| 5,328,331 | A | 7/1994 | Bunker et al. | |
| 5,344,283 | A | 9/1994 | Magowan et al. | |
| 5,484,258 | A | 1/1996 | Isburgh et al. | |
| 5,488,825 | A * | 2/1996 | Davis | F01D 5/187 415/115 |
| 5,516,260 | A | 5/1996 | Damlis et al. | |
| 5,626,462 | A | 5/1997 | Jackson et al. | |
| 5,645,397 | A * | 7/1997 | Soechting | F01D 5/187 415/115 |
| 5,993,156 | A | 11/1999 | Bailly et al. | |
| 5,997,245 | A * | 12/1999 | Tomita | F01D 5/187 415/115 |
| 6,065,928 | A | 5/2000 | Rieck, Jr. et al. | |
| 6,099,244 | A * | 8/2000 | Tomita | F01D 5/18 415/115 |
| 6,217,279 | B1 * | 4/2001 | Ai | F01D 9/065 415/110 |
| 6,238,182 | B1 | 5/2001 | Mayer | |
| 6,478,535 | B1 | 11/2002 | Chung et al. | |
| 6,874,988 | B2 * | 4/2005 | Tiemann | F01D 5/189 415/115 |
| 6,955,523 | B2 | 10/2005 | McClelland | |
| 7,004,720 | B2 | 2/2006 | Synnott et al. | |
| 7,097,417 | B2 | 8/2006 | Liang | |
| 7,198,458 | B2 | 4/2007 | Thompson | |
| 7,217,081 | B2 | 5/2007 | Scheurlen et al. | |
| 7,281,895 | B2 | 10/2007 | Liang | |
| 7,497,655 | B1 * | 3/2009 | Liang | F01D 5/189 415/1 |
| 7,527,474 | B1 | 5/2009 | Liang | |
| 7,641,445 | B1 | 1/2010 | Liang | |
| 7,758,314 | B2 | 7/2010 | Wilson et al. | |
| 7,775,769 | B1 | 8/2010 | Liang | |
| 7,785,072 | B1 | 8/2010 | Liang | |
| 7,798,768 | B2 | 9/2010 | Strain et al. | |
| 7,828,515 | B1 * | 11/2010 | Kimmel | F01D 5/189 415/115 |
| 7,862,291 | B2 | 1/2011 | Surace et al. | |
| 7,921,654 | B1 | 4/2011 | Liang | |
| 8,015,705 | B2 | 9/2011 | Wilson, Jr. et al. | |
| 8,118,553 | B2 | 2/2012 | Liang | |
| 8,353,669 | B2 | 1/2013 | Chon et al. | |
| 8,403,631 | B2 | 3/2013 | Surace et al. | |
| 8,403,632 | B2 | 3/2013 | Surace et al. | |
| 8,408,864 | B2 | 4/2013 | Fintescu et al. | |
| 8,864,438 | B1 * | 10/2014 | Lee | F01D 5/188 415/1 |
| 9,726,024 | B2 * | 8/2017 | Buhler | F01D 5/188 |
| 9,759,073 | B1 * | 9/2017 | Martin, Jr. | F01D 5/188 |
| 2005/0135921 | A1 | 6/2005 | Busch et al. | |
| 2010/0054915 | A1 * | 3/2010 | Devore | F01D 5/189 415/116 |
| 2011/0123351 | A1 * | 5/2011 | Hada | F01D 5/189 416/97 R |
| 2012/0034100 | A1 | 2/2012 | Malecki et al. | |
| 2013/0223987 | A1 | 8/2013 | Stafford et al. | |

* cited by examiner

BAFFLE FOR GAS TURBINE ENGINE VANE

CROSS-REFERENCE TO RELATED APPLICATION

This application claims priority to PCT Patent Application No. PCT/US2014/044883 filed Jun. 30, 2014, which claims priority to U.S. Patent Application Ser. No. 61/872,357 filed Aug. 30, 2013, each of which is hereby incorporated herein by reference in its entirety.

STATEMENT REGARDING FEDERALLY SPONSORED RESEARCH OR DEVELOPMENT

This disclosure was made with Government support under FA8650-09-D-2923 0021 awarded by the United States Air Force. The Government may have certain rights in this disclosure.

BACKGROUND

The present disclosure relates to a gas turbine engine and more particularly to a turbine vane cooling arrangement.

Gas turbine engines, such as those which power modern military aircraft, include a compressor section to pressurize a supply of air, a combustor section to burn a hydrocarbon fuel in the presence of the pressurized air, and a turbine section to extract energy from the resultant combustion gases and generate thrust. Downstream of the turbine section, an augmentor section, or "afterburner", is operable to selectively increase the thrust. The increase in thrust is produced when fuel is injected into the core exhaust gases downstream of the turbine section and burned with the oxygen contained therein to generate a second combustion.

The turbine section typically includes alternating rows of turbine vanes and turbine blades. The turbine vanes are stationary and function to direct the hot combustion gases that exit the combustor section. Due to the relatively high temperatures of the combustion gases, various cooling techniques are employed to cool the turbine vanes and blades.

The vanes typically include a hollow airfoil section with a leading edge wall followed by a pressure side wall and a suction side wall that converge to form a trailing edge. The hollow airfoil section is typically cooled with bleed air from the compressor section. Among the various cooling techniques are convection, impingement, film cooling as well as radiation within and through the airfoil wall surfaces.

Further, cooling airflows are often passed thru the turbine vanes to cool radially inboard or outboard components and structures. Although effective, the multiple cooling schemes result in a relatively complex inner vane structure which may transfer heat from the airfoil wall surfaces to the pass thru air and reduce the cooling effectiveness thereof.

SUMMARY

A vane structure for a gas turbine engine is provided according to one disclosed non-limiting embodiment of the present disclosure. The vane structure includes an airfoil section with a first inner airfoil wall surface and a second inner airfoil wall surface. The vane structure also includes a baffle mounted within the airfoil section between the first inner airfoil wall surface and the second inner airfoil wall surface to define a pass-thru passage and a cooling circuit at least partially around the pass-thru passage.

In a further embodiment of the present disclosure, the baffle is hollow.

In a further embodiment of any of the foregoing embodiments of the present disclosure, the baffle is generally rectilinear in cross-section.

In a further embodiment of any of the foregoing embodiments of the present disclosure, the baffle is generally airfoil shaped in cross-section.

In a further embodiment of any of the foregoing embodiments of the present disclosure, the cooling circuit forms a serpentine circuit.

In a further embodiment of any of the foregoing embodiments of the present disclosure, the airfoil defines an exit through the trailing edge. The exit is in communication with the serpentine circuit.

In a further embodiment of any of the foregoing embodiments of the present disclosure, the first inner airfoil wall surface and the second inner airfoil wall surface define respective airfoil seal surfaces.

In a further embodiment of any of the foregoing embodiments of the present disclosure, the baffle interlocks with the respective airfoil seal surfaces.

In a further embodiment of any of the foregoing embodiments of the present disclosure, the airfoil seal surfaces are corrugated surfaces.

In a further embodiment of any of the foregoing embodiments of the present disclosure, the baffle defines respective corrugated surfaces.

A vane structure for a gas turbine engine is provided according to another disclosed non-limiting embodiment of the present disclosure. This vane structure includes an airfoil section which defines an inner airfoil wall surface. The vane structure also includes a baffle mounted within the airfoil section to define a cooling circuit between the inner airfoil wall surface and the baffle. The cooling circuit defines a serpentine circuit.

In a further embodiment of any of the foregoing embodiments of the present disclosure, the baffle defines a pass-thru passage.

In a further embodiment of any of the foregoing embodiments of the present disclosure, the serpentine circuit is at least partially defined by a multiple of ribs in the inner airfoil wall surface.

In a further embodiment of any of the foregoing embodiments of the present disclosure, the baffle interlocks with the multiple of ribs.

In a further embodiment of any of the foregoing embodiments of the present disclosure, the baffle defines a closed end.

In a further embodiment of any of the foregoing embodiments of the present disclosure, the baffle is generally rectilinear in cross-section.

A method of communicating a cooling airflow through an airfoil of a gas turbine engine is provided according to another disclosed non-limiting embodiment of the present disclosure. This method includes locating a baffle within an airfoil section of a turbine vane to form a cooling circuit and a pass-thru. The cooling circuit is defined between an inner airfoil wall surface of the airfoil section and the baffle. The pass-thru passage is defined within the baffle.

In a further embodiment of any of the foregoing embodiments of the present disclosure, the method also includes closing a gap between the inner airfoil wall surface and the baffle during operation of the gas turbine engine.

In a further embodiment of any of the foregoing embodiments of the present disclosure, the method also includes accommodating a higher pressure within the pass-thru passage than in the serpentine circuit during operation of the gas turbine engine.

In a further embodiment of any of the foregoing embodiments of the present disclosure, the method also includes accommodating a lower temperature within the pass-thru passage than in the serpentine circuit during operation of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
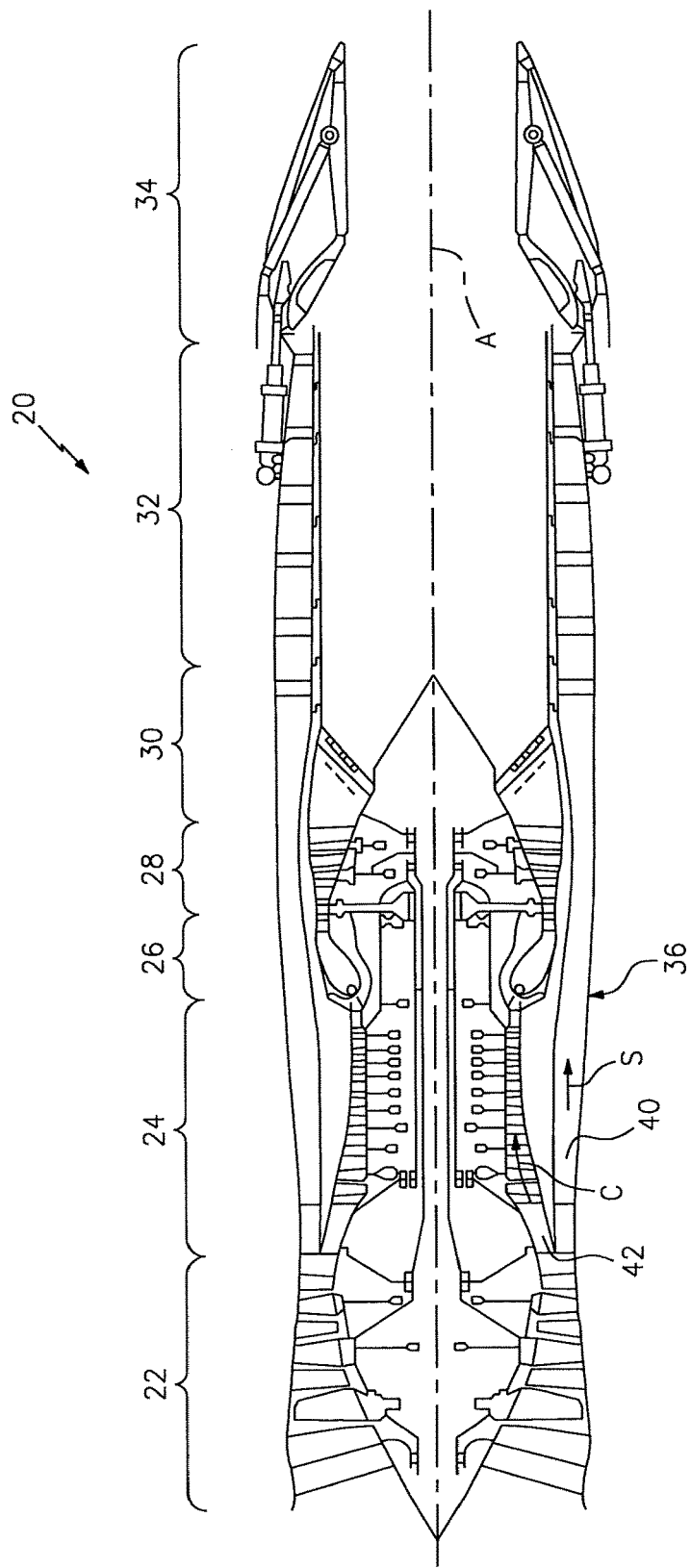
FIG. 1 is a schematic cross-section of a gas turbine engine.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle system 34 along a central longitudinal engine axis A. Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle adaptive engines and other engine architectures. Variable cycle gas turbine engines power aircraft over a range of operating conditions and essentially alters a bypass ratio during flight to achieve countervailing objectives such as high specific thrust for high-energy maneuvers yet optimizes fuel efficiency for cruise and loiter operational modes.

An engine case structure 36 defines a generally annular secondary airflow path 40 around a core airflow path 42. Various case structures and modules may define the engine case structure 36 which essentially defines an exoskeleton to support the rotational hardware.

Airflow into the engine 20 is generally divided between a core airflow C through the core airflow path 42 and a secondary airflow S through the secondary airflow path 40. The core airflow passes through the combustor section 26, the turbine section 28, then the augmentor section 30 where fuel may be selectively injected and burned to generate additional thrust through the nozzle system 34. The secondary airflow S is generally sourced from the core airflow C such as from within the compressor section 24 and may be utilized for a multiple of purposes to include, for example, cooling and pressurization. The secondary airflow S as defined herein may be any airflow different from the core airflow C. The secondary airflow S may ultimately be at least partially injected into the core airflow path 42 adjacent to the exhaust duct section 32 and the nozzle system 34. It should be appreciated that additional airflow streams such as third stream airflow typical of variable cycle engine architectures may additionally be provided.

The exhaust duct section 32 may be circular in cross-section as typical of an axisymmetric augmented low bypass turbofan or may be non-axisymmetric in cross-section to include, but not be limited to, a serpentine shape to block direct view to the turbine section 28. In addition to the various cross-sections and the various longitudinal shapes, the exhaust duct section 32 terminates with the nozzle system 34 such as a Convergent/Divergent (C/D) nozzle system, a non-axisymmetric two-dimensional (2D) C/D vectorable nozzle system, a flattened slot nozzle of high aspect ratio or other nozzle arrangement.

Figure 2:
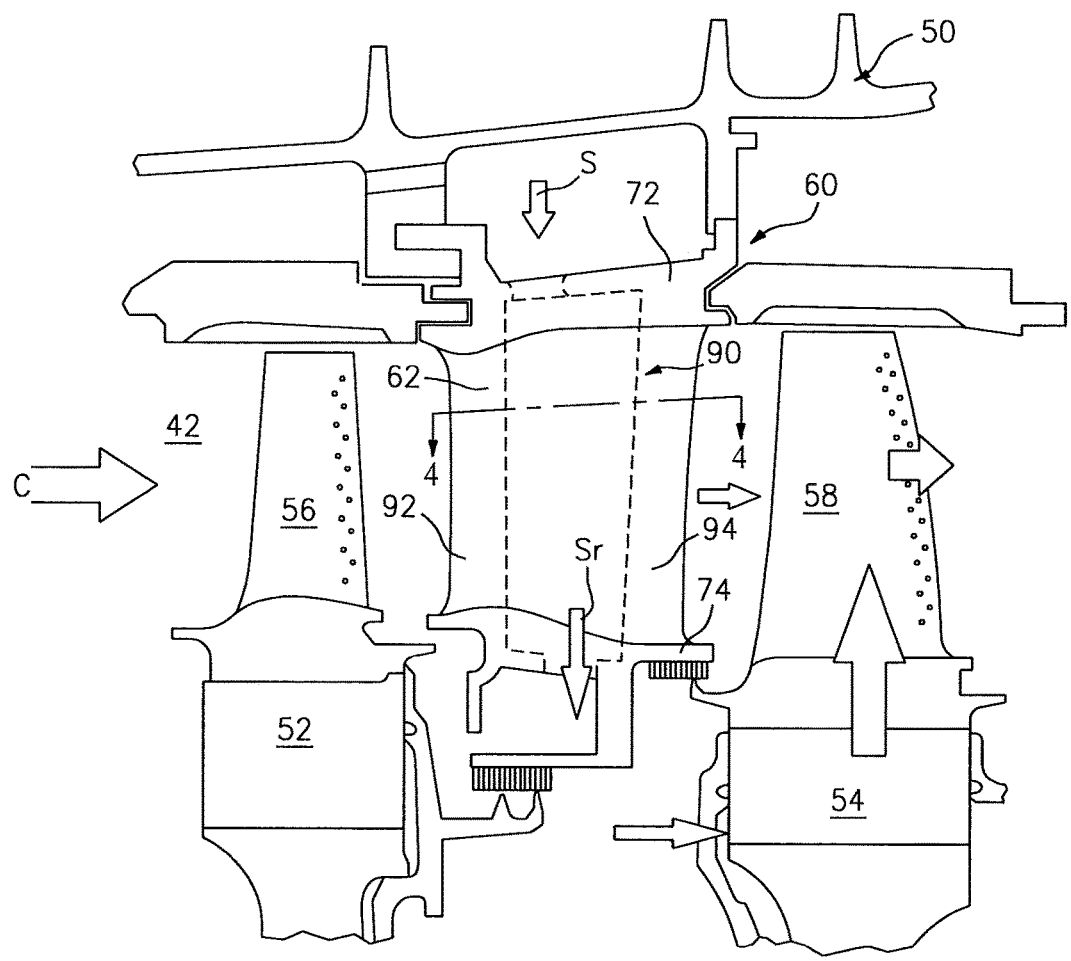
FIG. 2 is a sectional view of a turbine section.

With reference to FIG. 2, the turbine section 28 generally includes a turbine case 50 of the engine case structure 36 (see FIG. 1) that contains a multiple of turbine stages in which, for example, two rotors (two shown; 52, 54) are interspersed with a turbine nozzle (one shown; 60). Each of the rotors 52, 54 includes respective airfoil sections 56, 58 and the turbine nozzle 60, includes respective vane airfoil sections 62, along the core airflow path 42. It should be appreciated that any number of stages will benefit herefrom and although schematically depicted as the high pressure turbine in the disclosed embodiment, it should also be appreciated that the concepts described herein are not limited to use with high pressure turbines as the teachings may be applied to other sections such as low pressure turbines, power turbines, intermediate pressure turbines as well as other cooled airfoil structures and any number of stages.

Figure 3:
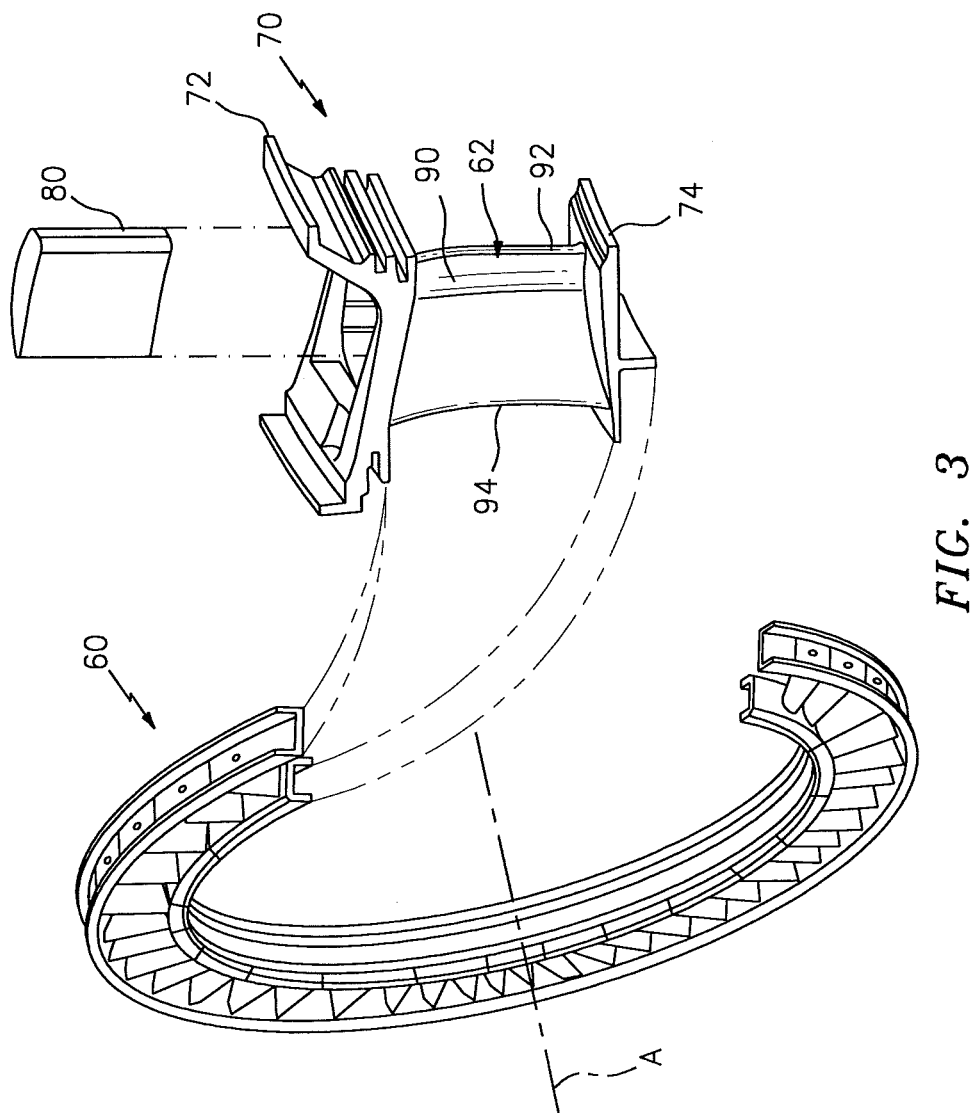
FIG. 3 is a partial exploded view of a vane ring of one turbine stage within a turbine section of the gas turbine engine, the vane ring formed from a multiple of segments.

The turbine nozzle 60 includes a multiple of nozzle segments 70 (FIG. 3). Each turbine nozzle segment 70 may include a single vane airfoil section 62 that extends radially between an arcuate outer vane platform 72 and an arcuate inner vane platform 74. It should be appreciated the any number of vane airfoil sections 62 may define each segment. Alternatively, the turbine nozzle 60 may be formed as a unitary full, annular ring.

The arcuate outer vane platform 72 may form a portion of an outer core engine structure and the arcuate inner vane platform 74 may form a portion of an inner core engine structure to at least partially define an annular turbine nozzle core airflow path. The circumferentially adjacent vane platforms 72, 74 define split lines which thermally decouple adjacent turbine nozzle segments 70. That is, the temperature environment of the turbine section 28 and the substantial aerodynamic and thermal loads under engine operation are accommodated by the plurality of circumferentially adjoining nozzle segments 70 which collectively form the full, annular ring about the centerline axis A of the engine.

Each vane airfoil section 62 is at least partially defined by an outer airfoil wall surface 90 between a leading edge 92 and a trailing edge 94. The outer airfoil wall surface 90 is typically shaped to define a generally concave shaped portion fondling a pressure side 90P and a generally convex shaped portion forming a suction side 90S (best seen in FIG. 4).

Figure 4:
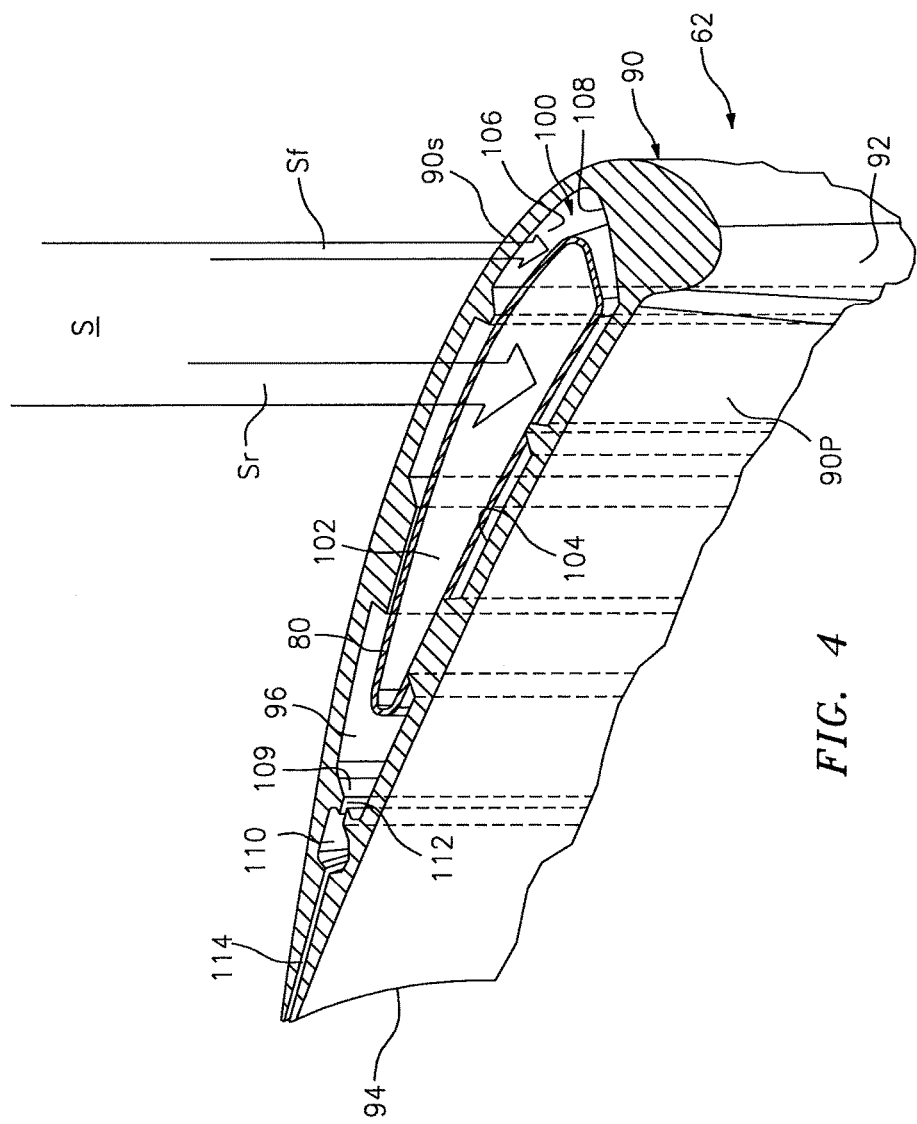
FIG. 4 is a lateral sectional view of a turbine vane taken along line 4-4 in FIG. 2.

With reference to FIG. 4, secondary airflow S is communicated into the vane airfoil section 62 to, for example, provide convective and film cooling airflow (illustrated schematically by arrow Sf) through a cooling circuit 100 which may form a serpentine (see FIG. 5) adjacent to the outer airfoil wall surface 90. The secondary airflow is also passed directly through the vane airfoil section 62 to, for example, communicate pass-thru airflow (illustrated schematically by arrow Sr) through a pass-thru passage 102 into, for example, rotor purge feed cavities. Generally, the convective and film cooling airflow Sf exits the vane airfoil section 62 directly into the core airflow path 42 while the pass-thru airflow Sr exits the inner vane platform 74 to provide cooling of radially inboard and downstream structures such as rotor 54.

The convective and film cooling Sf and the pass-thru airflow Sr are generally segregated by a baffle 80 located generally within the vane airfoil section 62. The baffle 80, in one disclosed non-limiting embodiment, is generally airfoil shaped in cross-section and hollow such that the pass-thru passage 102 is defined through by baffle 80. In one disclosed non-limiting embodiment, the baffle 80 may be assembled into the nozzle segment 70 through the inner vane platform 74.

The baffle 80 is located within a cavity 96 defined by a first inner airfoil wall surface 104 of the pressure side 90P and a second inner airfoil wall surface 106 of the suction side 90S. The first inner airfoil wall surface 104 and the second inner airfoil wall surface 106 meet at a leading edge inner airfoil surface 108 aft of the leading edge 92 and at a trailing edge inner airfoil wall surface 109 forward of the trailing edge 94. The trailing edge inner airfoil wall surface 109 may communicate with a trailing edge cavity 110 through a multiple of intermediate passages 112 and the trailing edge cavity 110 communicates with the core airflow path 42 adjacent to the trailing edge 94 via a multiple of trailing edge passage 114. It should be appreciated that various internal cavity and passage arrangements may alternatively or additionally be provided.

Figure 5:
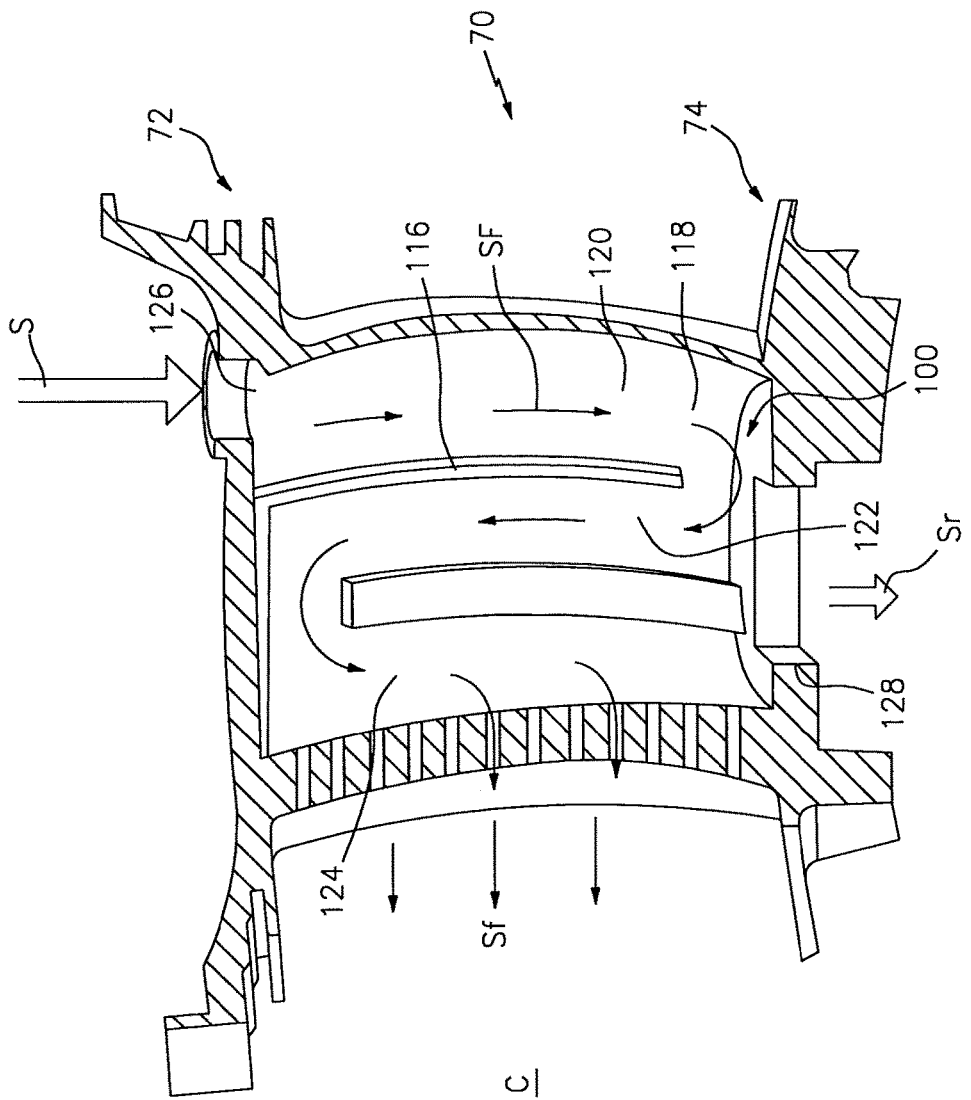
FIG. 5 is a side sectional view of the turbine vane illustrating a serpentine circuit therein.

With reference to FIG. 5, each of the first inner airfoil wall surface 104 and the second inner airfoil wall surface 106 define a multiple of ribs 116 which, through interface with the baffle 80, together form, in one disclosed non-limiting embodiment, a serpentine circuit 118 of the cooling circuit 100. The serpentine circuit 118 receives and directs the convective and film cooling airflow Sf through, for example, three thin wall passage segments 120, 122, 124 thereof along both inner airfoil wall surfaces 104, 106. That is, the baffle 80 forms a cold side of the cooling circuit 100 to form the serpentine circuit 118 while the first inner airfoil wall surface 104 and the second inner airfoil wall surface 106 forms a hot side of the cooling circuit 100. It should be further appreciated that the multiple of ribs 116 may be of various shapes, orientations and sizes to communicate the cooling airflow along various circuits.

The secondary airflow S may enter the serpentine circuit 118 as well as the baffle 80 through an entrance 126 located in the arcuate outer vane platform 72 of each turbine nozzle segment 70. The entrance 126 may be of a profile generally equivalent to the first passage segment 120 to direct secondary airflow S both outside the baffle 80 as convective and film cooling airflow Sf into the cooling circuit 100 and within the pass-thru passage 102 defined by the baffle 80 as pass-thru airflow Sr.

The pass-thru airflow Sr exits from the pass-thru passage 102 within the baffle 80 through an exit 128 in the arcuate inner vane platform 74. That is, the pass-thru airflow Sr generally passes linearly through at least one turbine nozzle segment 70 radially inward toward the centerline axis A of the engine.

The convective and film cooling airflow Sf exits the cooling circuit 100 within the turbine nozzle segment 70 into the core airflow path 42 through, for example, the multiple of trailing edge passage 114 (see FIG. 4). It should be appreciated that film cooling passages in communication with the serpentine circuit 118 other than the trailing edge passage 114 may alternatively or additionally be provided. The convective and film cooling airflow Sf thereby operates to convectively cool the outer airfoil wall surface 90 though the serpentine circuit 118 as well as film cool the outer airfoil wall surface 90 by exit through effusion passages such as the trailing edge passage 114

Figure 6:
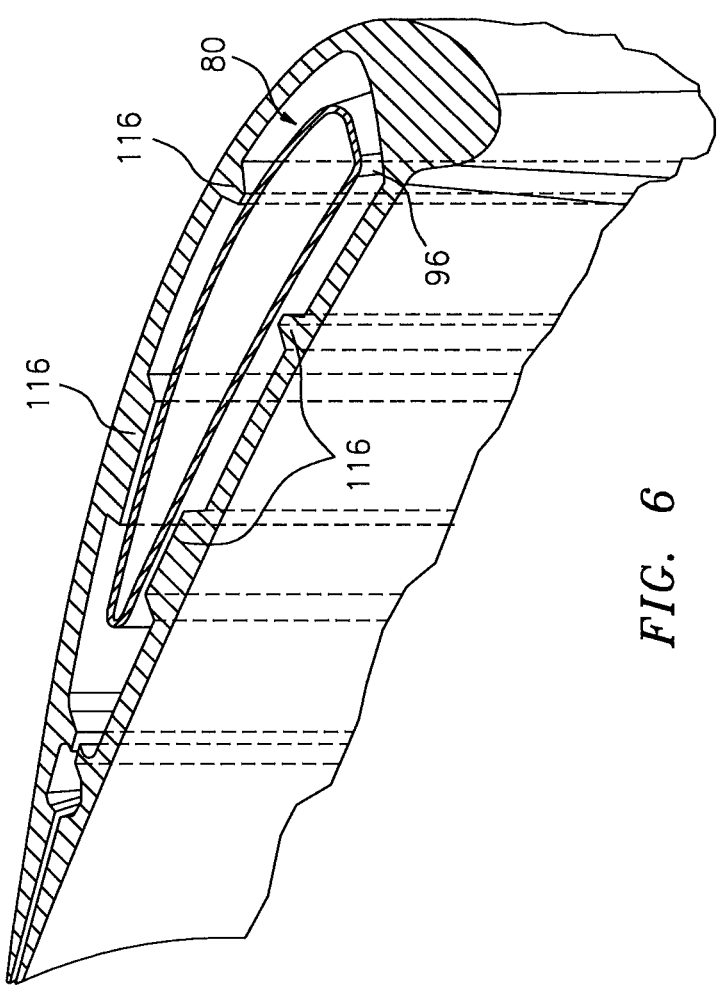
FIG. 6 is a sectional view of a turbine vane segment in an assembly condition.
Figure 7:
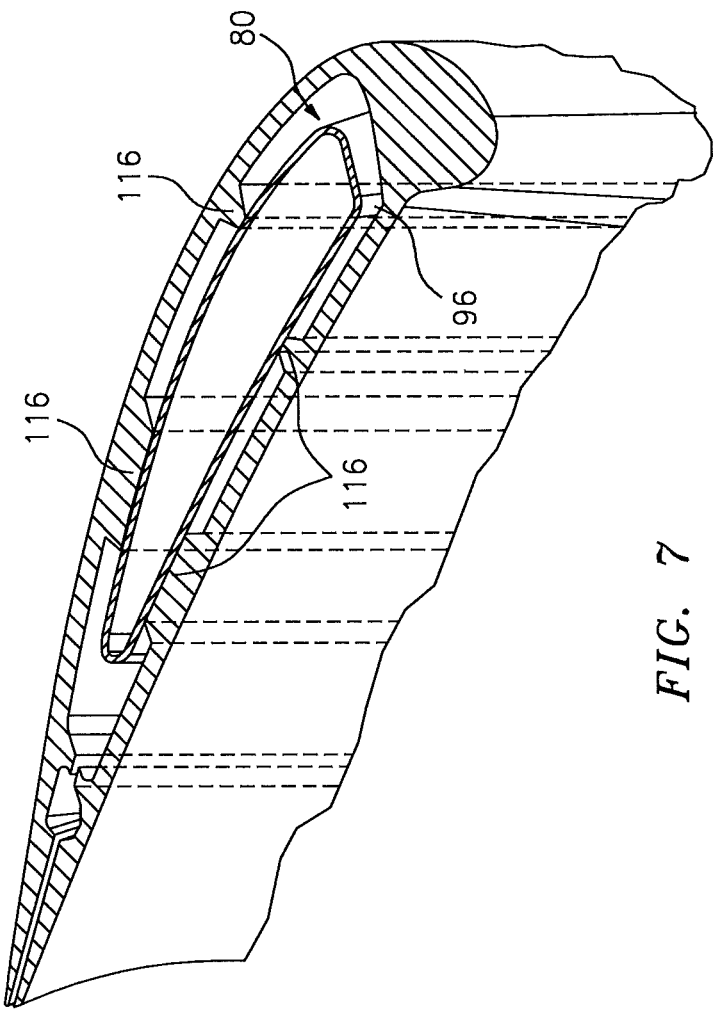
FIG. 7 is a sectional view of the turbine vane of FIG. 6 during engine operation.

With reference to FIG. 6, according to one disclosed non-limiting embodiment, the baffle 80 may be relatively loosely fit within the cavity 96 adjacent to the multiple of ribs 116. Relatively loosely as defined herein may include a clearance fit or an interference fit that facilitates assembly but may not provide a sufficient operational air seal between the baffle 80 and the multiple of ribs 116. Under operation of the gas turbine engine 20, however, the baffle 80 expands (see FIG. 7) due to the increase in temperature as well as the relatively higher pressure pass-thru airflow Sr within the baffle 80 compared to the relatively lower pressure convective and film cooling airflow Sf around the baffle 80. Expansion of the baffle 80 thereby may provide an effective seal between the baffle 80 and the multiple of ribs 116 in addition to, for example, material selection and thickness.

Figure 8:
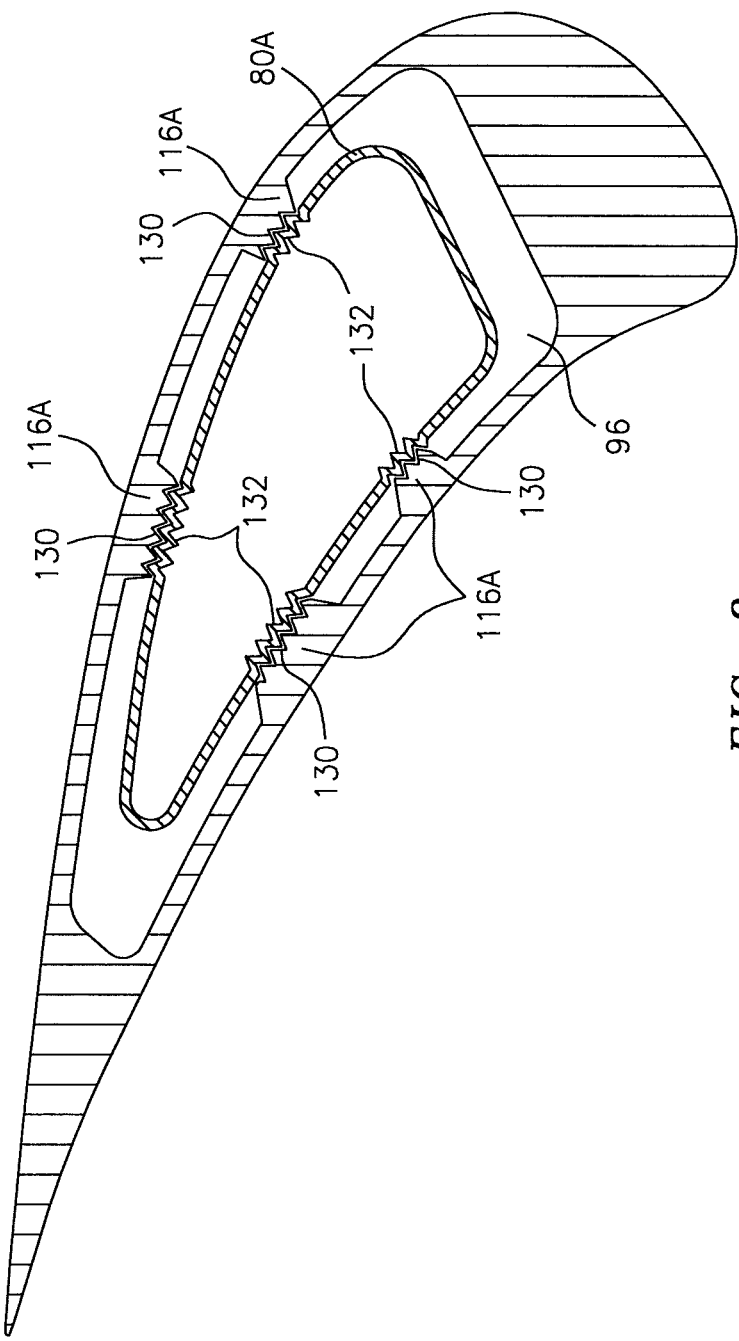
FIG. 8 is a lateral sectional view of the turbine vane according to another non-limiting embodiment.
Figure 9:
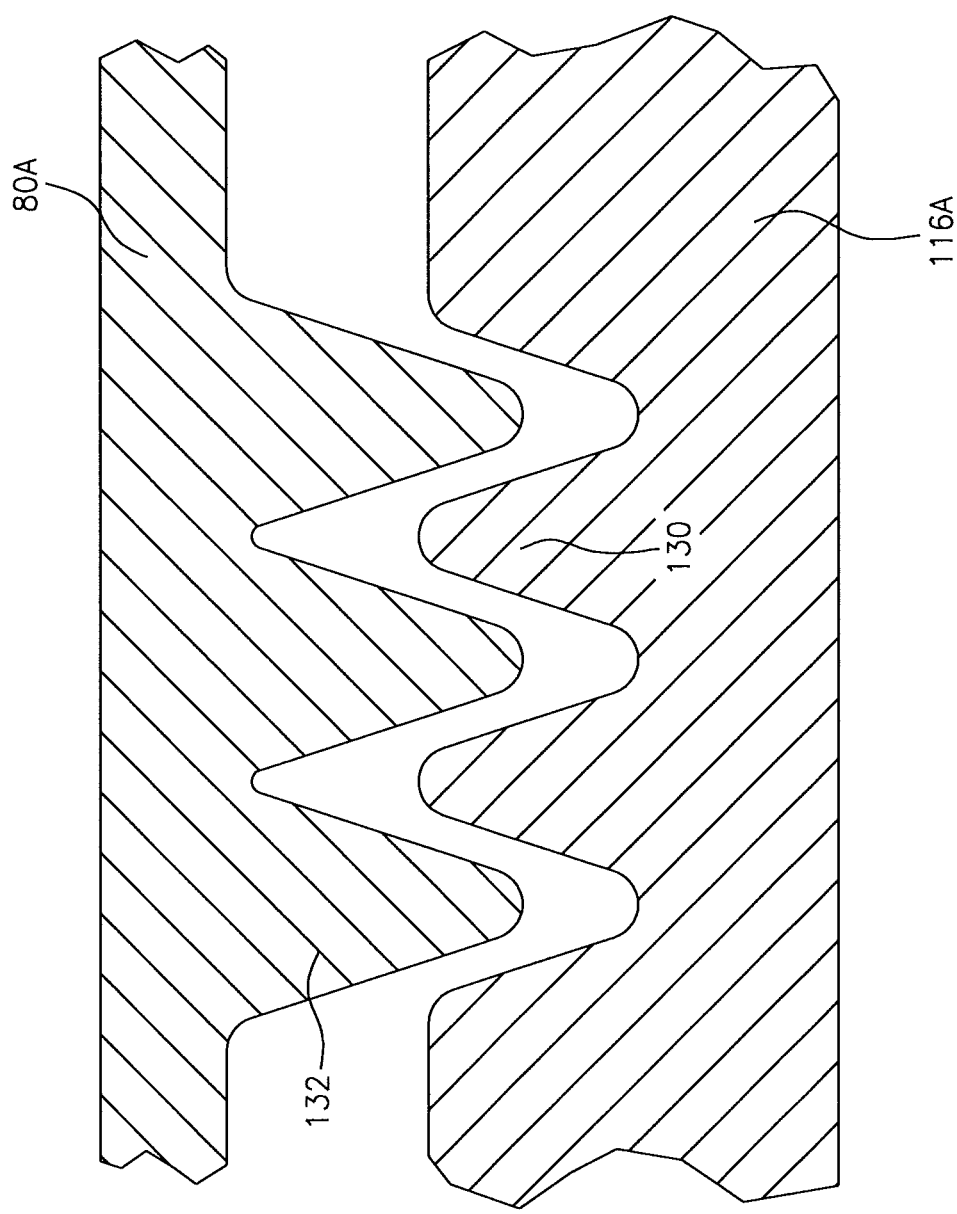
FIG. 9 is an expanded view of a baffle interlock.

With reference to FIG. 8, according another disclosed non-limiting embodiment, each of the multiple of ribs 116A includes an airfoil seal surface 130 that interlocks with a respective baffle seal surface 132. The airfoil seal surface 130 and the baffle seal surface 132 in this disclosed non-limiting embodiment are corrugated surfaces which facilitates the effective seal between the baffle 80A and the multiple of ribs 116A (see FIG. 9). It should be appreciated that other seal surfaces 130, 132 may alternately or additionally be provided including but not limited to, mechanical seals, coatings, airflow discouragers and others.

The convective and film cooling airflow Sf within the serpentine circuit 118 operates to insulates the baffle 80 and the pass-thru airflow Sr within the baffle 80 to facilitate relatively lower temperature pass-thru airflow Sr to downstream components. The relatively thin serpentine circuit 118 also facilitates more efficient usage of the secondary airflow S through the mach number increase to the convective and film cooling airflow Sf which increases heat transfer. That is, the baffle 80 facilitates manufacture of a thin serpentine circuit 118 as compared to conventional cast methods as only the ribs 116 need be cast or otherwise manufactured in the inner airfoil wall surfaces 104, 106.

It should be understood that relative positional terms such as "forward," "aft," "upper," "lower," "above," "below," "bottom", "top", and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A vane structure for a gas turbine engine, comprising:
   an airfoil section with a first inner airfoil wall surface and a second inner airfoil wall surface each having a plurality of ribs; and
   a baffle mounted within said airfoil section between said first inner airfoil wall surface and said second inner airfoil wall surface to define a pass-through passage and a cooling circuit at least partially around said pass-through passage, where the baffle is relatively loosely fit within a cavity of said airfoil section adjacent to a plurality of ribs and during operation of the gas turbine engine said baffle expands due to an increase in temperature and due to high pressure pass-through airflow in the pass-through passage within the baffle in comparison to lower pressure airflow in the cavity but outside the pass-through passage to seal between said baffle and said plurality of ribs.

2. The vane structure as recited in claim 1, wherein said baffle is hollow.

3. The vane structure as recited in claim 1, wherein said baffle is generally airfoil shaped in cross-section.

4. The vane structure as recited in claim 1, wherein said cooling circuit forms a serpentine circuit.

5. The vane structure as recited in claim 4, wherein said airfoil defines an exit through said trailing edge, said exit in communication with said serpentine circuit.

6. The vane structure as recited in claim 1, wherein said first inner airfoil wall surface and said second inner airfoil wall surface define respective airfoil seal surfaces.

7. The vane structure as recited in claim 6, wherein said plurality of ribs each comprise baffle interlocks that engage with said respective airfoil seal surfaces.

8. The vane structure as recited in claim 7, wherein said airfoil seal surfaces comprise corrugated airfoil surfaces.

9. The vane structure as recited in claim 8, wherein said baffle interlocks comprise corrugated baffle surfaces.

10. A vane structure for a gas turbine engine, comprising:
    an airfoil section which defines an inner airfoil wall surface having a plurality of ribs; and
    a baffle mounted within said airfoil section to define a cooling circuit between said inner airfoil wall surface and said baffle, said cooling circuit defines a serpentine circuit where the baffle is relatively loosely fit within a cavity of said airfoil section adjacent to said plurality of ribs and during operation of the gas turbine engine said baffle expands due to an increase in temperature and due to high pressure-pass through airflow in the pass-through passage within the baffle in comparison to lower pressure airflow in the cavity but outside the pass-through passage to seal between said baffle and said plurality of ribs.

11. The vane structure as recited in claim 10, wherein said baffle defines a pass-through passage.

12. The vane structure as recited in claim 10, wherein said cooling circuit is at least partially defined by a multiple of ribs in said inner airfoil wall surface.

13. The vane structure as recited in claim 12, wherein said baffle interlocks with said multiple of ribs.

14. The vane structure as recited in claim 13, wherein said baffle interlocks with said multiple of ribs using corrugated surfaces on both said baffle and said multiple of ribs.

* * * * *

UNITED STATES PATENT AND TRADEMARK OFFICE
CERTIFICATE OF CORRECTION

| | |
|---|---|
| PATENT NO. | : 10,240,470 B2 |
| APPLICATION NO. | : 14/911148 |
| DATED | : March 26, 2019 |
| INVENTOR(S) | : Hagan et al. |

Page 1 of 1

It is certified that error appears in the above-identified patent and that said Letters Patent is hereby corrected as shown below:

In the Specification

Column 5, Line 1, delete "fondling" and insert --forming--.

Signed and Sealed this
Seventh Day of May, 2019

Andrei Iancu
*Director of the United States Patent and Trademark Office*